No. 858,432. PATENTED JULY 2, 1907.
N. J. WIGGINTON.
MUZZLE.
APPLICATION FILED OCT. 24, 1906.
3 SHEETS—SHEET 1.
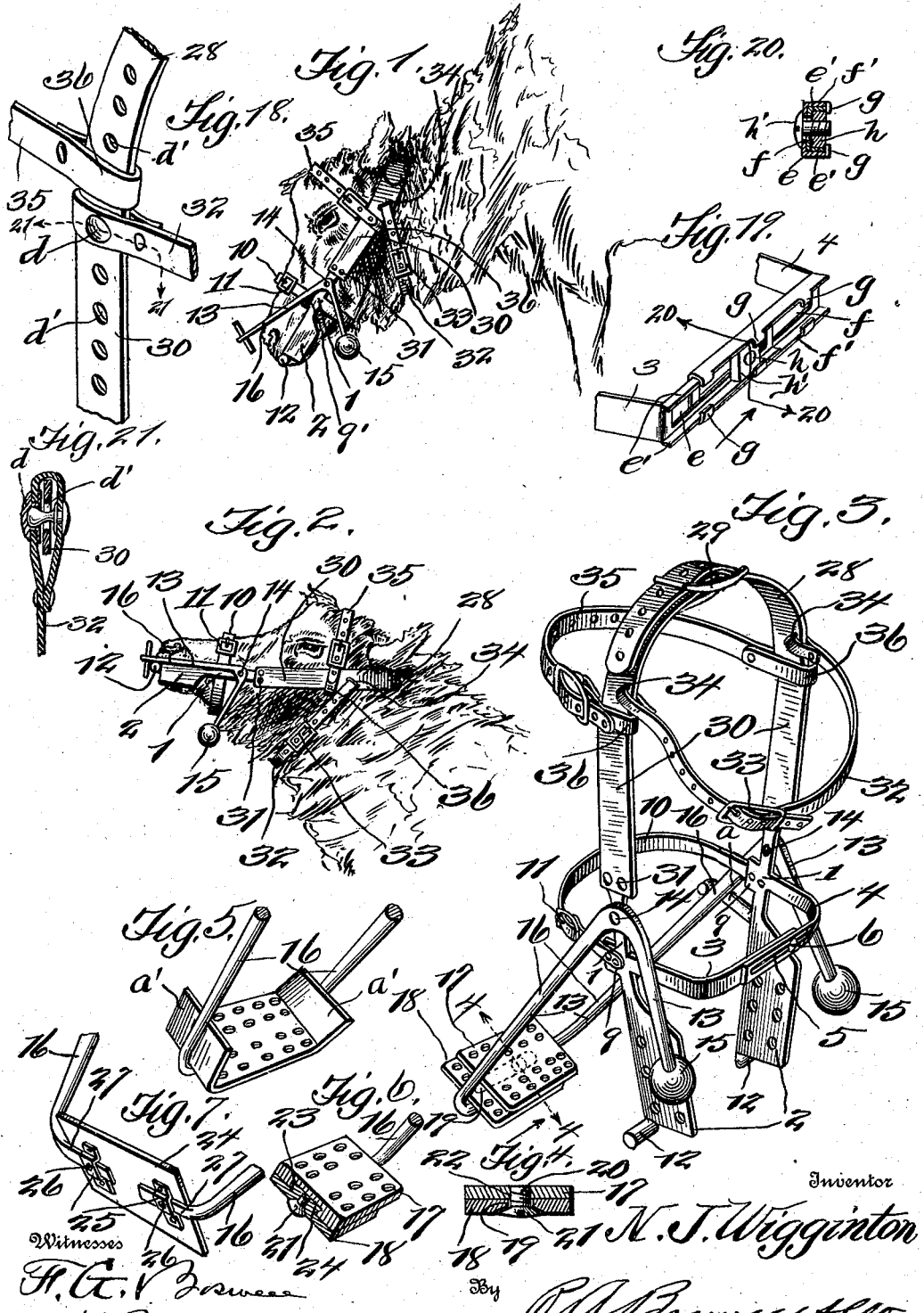

No. 858,432. PATENTED JULY 2, 1907.
N. J. WIGGINTON.
MUZZLE.
APPLICATION FILED OCT. 24, 1906.
3 SHEETS—SHEET 2.
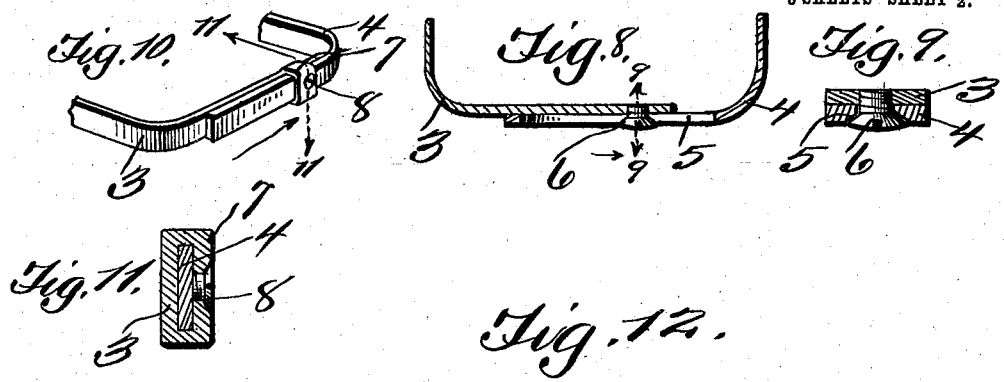
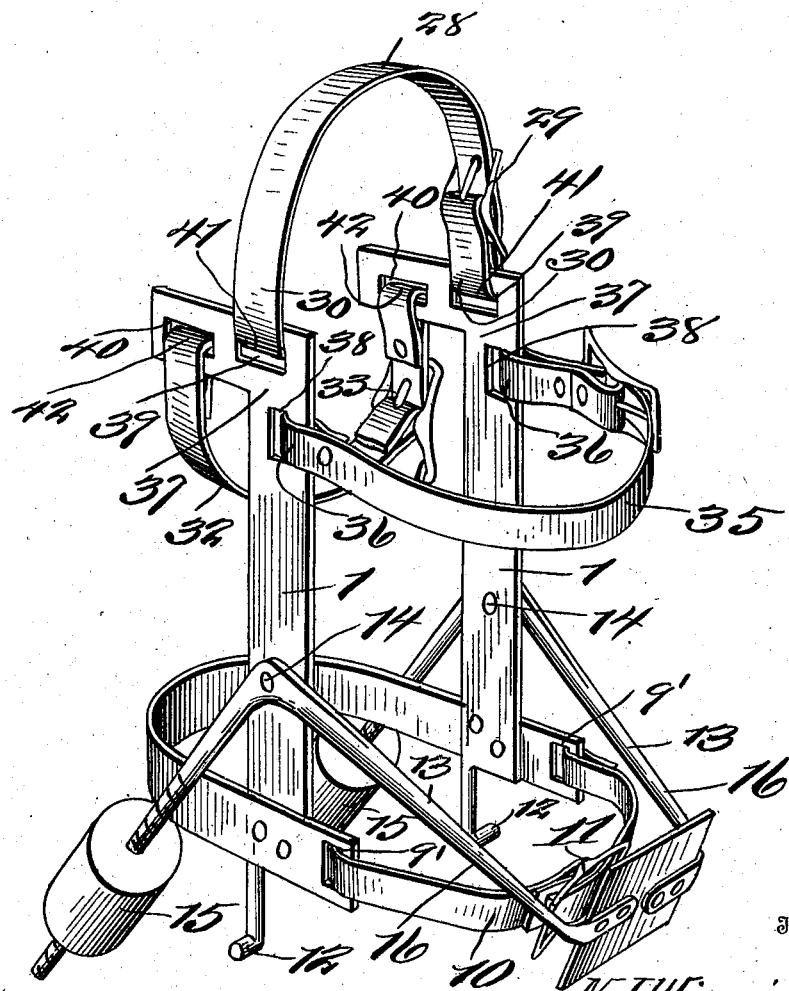
Witnesses
Inventor
N. J. Wigginton.
By his Attorneys No. 858,432. PATENTED JULY 2, 1907.
N. J. WIGGINTON.
MUZZLE.
APPLICATION FILED OCT. 24, 1906.
3 SHEETS—SHEET 3.
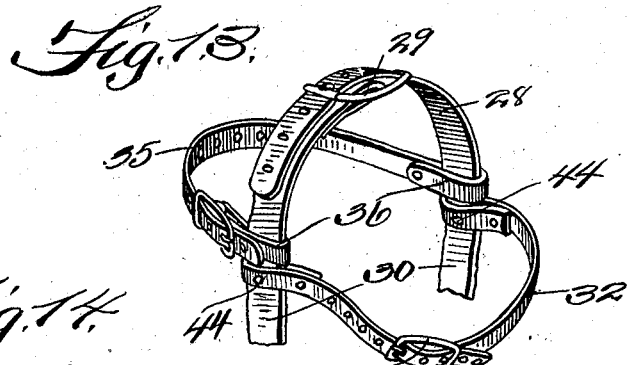
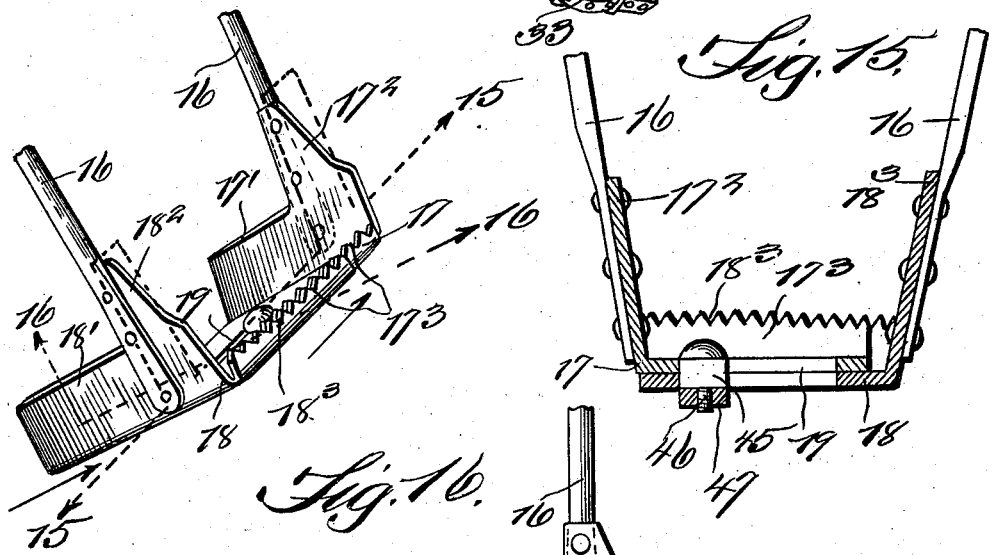
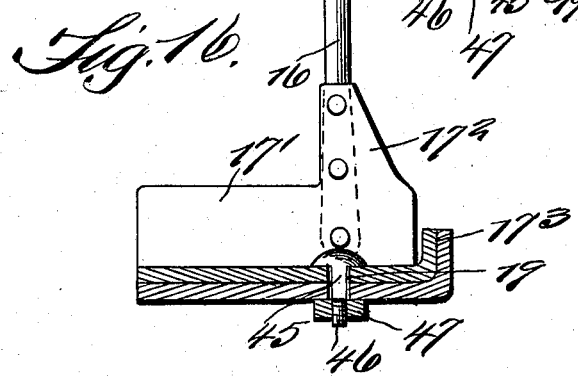
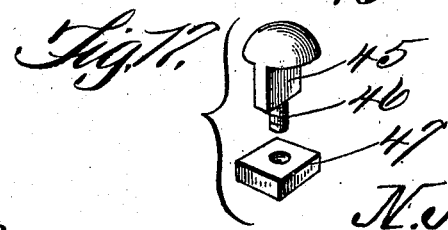

UNITED STATES PATENT OFFICE.

NEWTON J. WIGGINTON, OF CHAMBERSVILLE, VIRGINIA.

MUZZLE.

No. 858,432.  Specification of Letters Patent.  Patented July 2, 1907.

Application filed October 24, 1906. Serial No. 340,367.

*To all whom it may concern:*

Be it known that NEWTON J. WIGGINTON, a citizen of the United States of America, residing at Chambersville, in the county of Frederick, in the State of Virginia, have invented a new and useful Muzzle, of which the following is a specification.

This invention relates to a muzzle or guard for animals, and the object thereof, is to provide a device of this character, which is not only efficient and esthetic in construction and contour but is otherwise very practical in the adaptation thereof; furthermore the invention comprises the vertical side plates having broad extending side mouth guards, the arched lower jaw elements integral with the side plates, which arched lower jaw elements are suitably adjustable to fit any sized head of any animal, a crown strap having its ends suitably secured to the side plates, said crown strap being suitably adjustable and having a suitable brow band and throat latch which are also suitably adjustable to fit any sized head of any animal, said side plates also having a nose strap which is also suitably adjustable with relation to the head of any animal to which the muzzle is attached for the purpose intended, as hereinafter set forth.

The essential and primary object of the invention is to provide a muzzle which when in practical use, that is, when the animal raises his head to destroy by eating of fruit trees, vines, or any other agricultural product, which grows above the level of the ground and which is desired to be preserved, while the animal is pasturing will prevent him from doing so, but ordinarily the animal has perfect freedom of his mouth when grazing in the pasture; this result is obtained, by providing the muzzle with a weighted oscillatory element, which is approximately U-shaped in top view, and L-shaped in side view, which may have or may not have a perforated or solid plate, as shown in the drawings to form a front mouth guard, which may be obviously changed or modified, that is, according to the views of the applicant, the side plates are provided at their lower ends with lateral projecting stops, to limit the oscillatory motion of the said element. This front mouth guard is suitably adjustable, which adjustable feature may be obviously modified, as illustrated in Figures 3, 4, 5 and 6, or if convenient and desirable may be otherwise adjustable, such as, by allowing the side arms of the oscillatory element, to be separated from the said front mouth guard, and adjustably with relation thereto, as illustrated in Fig. 7.

All of the adjustable features may be suitably modified, so as to render the device simple and practical in the manufacture thereof, and the material to be used in the manufacture thereof rests entirely and absolutely with the parties concerned in the ownership of the device, and suitable to their own convenience.

This device is conveniently and manifestly adaptable for use in connection with any species of animal, as will be readily and clearly understood. The device not only prevents crop growing a distance above the level of the ground, from being destroyed, but also prevents self milking, when used for that purpose and when weaning young animals this device serves an excellent purpose.

This invention comprises further objects and combinations of elements which will be hereinafter more fully described, shown in the accompanying drawings, and the novel features thereof will be pointed out by the appended claims.

To obtain a full and correct understanding of the details of construction, combinations of features, elements and advantages, reference is to be had to the hereinafter set forth description and the accompanying drawings in connection therewith, wherein Fig. 1 is a view showing the improved device worn by an animal, and showing his mouth near the ground, but showing the oscillatory element in such a position so that his mouth may have free movement. Fig. 2 is a view showing the head of the animal thrown up, in an apt position with his mouth in readiness to destroy vines or fruit trees, but with the oscillatory element having the front mouth guard thrown in a position in front of his mouth to prevent him doing so. Fig. 3 is a perspective view of the muzzle or mouth guard clearly showing the essential features thereof. Fig. 4 is a sectional view on line 4—4 of Fig. 3. Fig. 5 is a detail perspective view showing the front mouth guard as integral with the arms of the oscillatory element. Fig. 6 is a detail perspective view showing a modified form of adjustment, for the front mouth guard. Fig. 7 is a detail perspective view showing a modified form of the front mouth guard, in which the arms of the oscillatory element are detachable from the said mouth guard, and adjustable with relation thereto. Fig. 8 is a horizontal section through the arched lower jaw element, showing the adjustable feature thereof, that is the preferable form. Fig. 9 is a sectional view on line 9—9 of Fig. 8. Fig. 10 is a detail perspective view of the arched lower jaw element, showing a modified form of adjustment therefor. Fig. 11 is a sectional view on line 11—11 of Fig. 10. Fig. 12 is a perspective view of a modified form of a complete muzzle or mouth guard. Fig. 13 is a detail view of a modification, showing the throat latch as riveted to the sides of the crown strap. Fig. 14 is a detail perspective view of a modified form of the oscillatory element. Fig. 15 is a sectional view on the line 15—15 of Fig. 14. Fig. 16 is a sectional view on line 16—16 of Fig. 14. Fig. 17 is a detail view of a modified form of the nut and bolt fastening means, for the sections of the oscillatory element, or for fastening the arched lower jaw elements.

Fig. 18 is a detail view showing a modification of connection for the throat latch, and brow band. Fig. 19 is a detail view showing a modification of adjustment for the members 3 and 4. Fig. 20 is a sectional view on line 20—20 of Fig. 19. Fig. 21 is a section on line 21—21 of Fig. 18.

Making renewed reference to the accompanying drawings, wherein similar reference characters indicate corresponding parts in the several illustrations, by figures, 1 designates the suitable side plates of the muzzle having the broad extending side mouth guard 2, which may be or may not be perforated, as shown in the drawings, which broad extending side mouth guard forms suitable means to prevent the animal from working any twigs or leaves or any other part of fruit trees or vines in the side of its mouth, as will be apparently clear from an inspection of the drawings; these guards also prevent the animal from gnawing the bark from the trunks of trees.

Integral with the side plates are the arched lower jaw elements 3 and 4, which lap one another, as shown, and one of which elements is provided with an elongated slot 5, to receive the shank of the screw 6, which is threaded in the element 3, as shown in Figs. 8 and 9, so as to render the arched lower jaw elements suitably adjustable to fit any size head. The adjustable feature for the arched lower jaw element, may be evidently modified in different ways, and within the scope of the appended claims, for instance, as illustrated in Figs. 10 and 11; the arched lower jaw elements being still lapped in this form upon one another, but one of said elements being provided with a metallic strap or loop 7, having a screw 8 threaded therein, which frictionally engages the element 4, which moves through the strap or loop 7.

Adjacent to the front where the elements 3 and 4 are integral with the side plates are extensions 9, to which the ends of the nose strap 10, are riveted, which nose strap is provided with a suitable buckle 11, or any other suitable means, so as to render the same adjustable with relation to the head of an animal. The lower ends of the said side plates are provided with lateral projecting stops 12, to limit the movement of the oscillatory element 13, which is, as before stated, U-shaped in top view and L-shaped in side view, and is pivoted, as at 14, to the side plates; a portion of said oscillatory element is provided with weights 15, which operate the said oscillatory element when the animal raises his head, as shown in Fig. 2 of the drawings. The arms 16 of said oscillatory element are provided at their lower ends with plates 17 and 18, forming a front mouth guard; this front mouth guard is for the purpose of being thrown in front of the animal's mouth, as shown in Fig. 2, and is made in two sections as before stated which are adjustably held with relation to one another by means of a slot 19, which receives a shank 20 of the screw 21, which is threaded in an aperture 22, of the plate 17, as shown clearly in Figs. 3 and 4 of the accompanying drawings. If it is possible for the animal, which is wearing the muzzle, to throw his head high enough, so as to throw the oscillatory element over his head, the device just above the broad extending side mouth guards is provided with a stop $a$, against which the arms 16 of the oscillatory element engages, thus limiting the movement thereof. This front mouth guard may be or may not be perforated, but this feature rests entirely with the discretion of the applicant, as will be obviously understood.

In Fig. 5 the front mouth guard is made integral with the side arms of the oscillatory element; in this Fig. 5, the front mouth guard is extended upward on each side thereof, as at $a'$, as clearly shown. Fig. 6 shows a slight modification of the front mouth guard, in which the plates 17 and 18 are made adjustable with relation to one another, by providing a longitudinal recess 23 in one, the side walls of which converge, and a longitudinal rib 24 on the plate 18, to fit the recess 23, as shown; in this form the usual screw 21 is used, for frictionally holding the said plates in adjusted position.

Fig. 7 shows still further a modification of the front mouth guard, in which two plates are eliminated; this is accomplished by only using one plate 24, which is provided with a pair of straps 25 in which is threaded screws 26, which frictionally hold the ends of the arms of the oscillatory element, that is, after the lateral portions 27 are inserted through the straps 25, this allows the said arms to be detachable, but yet adjustable with relation to the mouth guard plate, as illustrated.

The muzzle is provided with the crown strap 28 having a buckle 29, for the purpose of adjusting the same to different sized heads; the sides of the crown strap, which are designated by the numeral 30 are suitably secured to the side plates, as shown at 31, by means of rivets, or any other suitable means may be employed. This crown strap has secured thereto a throat latch 32, which is provided with a buckle 33 for the purpose of adjustment; this throat latch is positioned at a slight angle to the sides of the crown strap, and the ends of which are fastened to the said crown strap by means of small slots 34, as shown clearly in Fig. 3 of the drawings.

The muzzle is provided with a brow band 35 having a suitable buckle, so as to render the same adjustable with relation to any sized head; the ends of this brow band are formed into loops 36 which receive the sides of the crown strap, as shown in Fig. 3 of the accompanying drawings, for the purpose of allowing the brow band to have a slight vertical movement thereof.

In Fig. 12 the muzzle substantially as a whole is slightly modified, in as much that the lower jaw element eliminates the adjustable feature, and also the weights of the oscillatory element, are adjustably held thereon. The side plates in this form are of substantially an inverted L-shaped design, as shown at 37, each of which is provided with a plurality of slots 38 39 and 40; the slots 38 receive the loops 36 of the brow band, the slots 39 receive loops 41 of the crown straps, and the slots 40 are designed to receive the loops 42, as clearly illustrated in Fig. 12.

In Figs. 1, 2 and 12, adjacent to the front where the elements 3 and 4 are integral with the side plates, are metallic loops 9', to receive the ends of the nose strap 10, which is provided with a suitable buckle 11, or any other suitable means, so as to render the same adjustable with relation to the head of the animal. In Fig. 13, the throat latch 32 is shown as riveted to the sides of the crown strap, as at 44, so as to prevent the brow band from slipping down upon the sides of the crown strap, because the brow band is fastened to the sides of the crown strap by loops, as clearly shown.

Figs. 14, 15 and 16 illustrate a modification of a portion of the oscillatory element, in which the plates 17 and 18 are extended up on the sides, as at 17′ and 18′, so as to provide more of a complete front mouth guard; these plates 17 and 18 are also provided with extensions 17² and 18², as clearly shown in the accompanying drawings. The front edges of the plates 17 and 18 are turned to form a flange 17³, which flange is provided with teeth 18³ so that when the animal throws his head forward in the act of biting some one, his mouth will come in contact with the teeth of the flange, as will be clearly evident.

Fig. 17 illustrates a modification of the fastening means for the sections of the oscillatory element, or for fastening the arched lower jaw elements; this fastening means comprises a bolt having the usual head, a flattened portion 45, the width of which is equal to the width of the head of the bolt; projecting from this flattened portion is a threaded stud 46, to receive the nut 47; this flattened portion is designed to move within the slots 19 of the plates 17 and 18, thereby preventing said plates from turning, as will be clearly apparent from an inspection of the drawings.

In Fig. 18, the throat latch 32 is shown as provided with a loop, to fit the sides of the crown strap, as clearly shown; each side of this loop is provided with a section of a fastening device d, the outside part of the loop carries the socket member of the fastening device and the inside of the loop carries the projection, which extends through the openings d′ and then into the socket member of the fastening device, that is when the throat latch is adjusted in the desired position, as will be clearly evident.

Figs. 19 and 20 illustrate a modification of the adjustable feature of the lower jaw elements 3 and 4, in which figures the element 3 is provided with a portion e, extending at right angles thereto, which portion is provided with flanges e′; this portion e is received by a similar portion f carried by the element 4, as clearly shown; this portion f is also provided with flanges f′, which flanges have ears g which are bent over to prevent displacement of the two elements, but will at the same time allow adjustment of the portions e and f, as will be understood. Extending through the two portions e and f is a screw h which is designed to have threaded connections with a nut h′ carried between the flanges e′ of the portion e, this feature just described is designed for the purpose of clamping the two portions when adjusted.

It is to be understood that various changes and modifications may be employed in the construction and embodiment thereof, combinations of features, and elements, without in any way departing from the spirit and scope of the invention covered by the claims thereof; it being understood that whatever variations or modifications are employed must fall within the scope of the appended claims.

From the foregoing, the essential features, elements and the operation of the device, together with the simplicity thereof, will be clearly apparent.

Having thus fully described the invention, what is claimed as new and useful by the protection of Letters Patent, is—

1. In a muzzle a pair of side plates, a crown strap, brow band and throat latch therefor, an oscillatory element and an arched lower jaw element, and means for adjustment therefor said plates having means to limit the movement of the oscillatory element.

2. In a muzzle, a crown strap having a brow band and throat latch, side plates secured to the lower ends of the crown strap having extending side mouth guards, an oscillatory element and an arched lower jaw element having means for adjustment thereof.

3. In a muzzle, a crown strap having a brow band and throat latch, side plates secured to the lower ends of the crown strap having broad extending side mouth guards, an arched lower jaw element having means for adjustment thereof, an oscillatory element pivoted to said side plates and having parallel side arms and means for adjusting the said arms laterally.

4. In a muzzle, a pair of side plates, a crown strap secured thereto having a brow band and throat latch, an oscillatory element pivoted to said side plate and having side arms, a front mouth guard secured to the lower end of the said arms and means for adjusting the front mouth guard.

5. In a muzzle, a pair of side plates, a crown strap secured thereto and having a brow band and throat latch, means carried separably by said crown strap, brow band and throat latch for adjustment thereof, said side plates having broad extending side mouth guards, a weighted oscillatory element pivoted to said side plates, said side plates having lateral projecting stops to limit the oscillatory motion of said element.

6. In a muzzle, a pair of side plates, a crown strap secured thereto and having a brow band and throat latch, means carried separably by said crown strap, brow band and throat latch for adjustment thereof, said side plates having broad extending side mouth guards, a weighted oscillatory element pivoted to said side plates, said side plates having lateral projecting stops to limit the oscillatory motion of said element, said oscillatory element having side arms and an adjustable front mouth guard carried by said arms.

7. In a muzzle, a pair of side plates, a crown strap, brow band and throat latch therefor, means carried separably by said crown strap, brow band and throat latch for adjustment thereof, an arched lower jaw element having means for adjusting the same, said side plates having broad extending side mouth guards, an oscillatory element, the said side plates having lateral projecting stops to limit the oscillation thereof.

8. In a muzzle, a framing composed of side plates having an arched lower jaw element, means for adjusting the same, a crown strap, brow band and throat latch for said frame, said side plates having a nose strap secured thereto, an oscillatory element having means for adjustment thereof.

9. In a muzzle, a pair of side plates, a crown strap, brow band and throat latch therefor an arched lower jaw element composed of two parts, one of said parts having an elongated slot; the other having a screw threaded therein adapted to clamp the two parts together, said side plates having a nose strap secured thereto, and means for adjusting said nose strap and a weighted oscillatory element for said muzzle.

10. In a muzzle, a pair of side plates having broad extending side mouth guards, said side plates having a crown strap, a brow band and throat latch for the crown strap, means carried separably by said crown strap, brow band and throat latch for adjustment thereof, said side plates having an arched lower jaw element composed of two sections, one of which has an elongated slot; the other having a screw threaded therein, said screw adapted to extend through said slot so as to clamp the two sections together, said side plates having extensions, a nose strap the ends of which being secured to said extensions, means for adjusting said nose strap, an oscillatory element pivoted to said side plates, said side plates having means to limit the oscillation thereof, said oscillatory element having parallel arms, an adjustable front mouth guard carried by said arms, said oscillatory element having substantially right angled arms extending thereto and weights carried thereby.

11. A muzzle having side plates; a crown strap; brow band; throat latch; nose strap; and an arched lower jaw element; and a weighted oscillatory element having means for adjustment thereof.

12. A muzzle having side plates; a crown strap; brow band; throat latch; nose strap; and an arched lower jaw element; a weighted oscillatory element having means for adjustment thereof; said plates having means for limiting the movement of the oscillatory element in either direction.

13. A muzzle having side plates; a crown strap; brow band; throat latch; nose strap; and an arched lower jaw element; a weighted oscillatory element having means for adjustment thereof; and means for adjusting the brow band and throat latch upon the crown strap.

14. A muzzle having side plates; a crown strap; brow band; throat latch; nose strap; and an arched lower jaw element; a weighted oscillatory element; and means for adjusting the brow band and throat latch upon the crown strap.

In witness whereof, the applicant's signature is hereunto affixed in the presence of two witnesses.

NEWTON J. WIGGINTON.

Witnesses:
ROBERT A. BOSWELL,
JOHN R. WIGGINTON.